United States Patent
Shmunk et al.

(10) Patent No.: US 10,282,822 B2
(45) Date of Patent: May 7, 2019

(54) DIGITAL CORRECTION OF OPTICAL SYSTEM ABERRATIONS

(71) Applicant: Almalence Inc., Austin, TX (US)

(72) Inventors: Dmitry Valerievich Shmunk, Novosibirsk (RU); Victor Aleksandrovich Monarev, Berdsk (RU)

(73) Assignee: ALMALENCE INC., Austin, TX (US)

(*) Notice: Subject to any disclaimer, the term of this patent is extended or adjusted under 35 U.S.C. 154(b) by 151 days.

(21) Appl. No.: 15/366,797

(22) Filed: Dec. 1, 2016

(65) Prior Publication Data
US 2018/0158175 A1  Jun. 7, 2018

(51) Int. Cl.
*G06K 9/40* (2006.01)
*G06T 5/00* (2006.01)
*G06T 5/20* (2006.01)

(52) U.S. Cl.
CPC .............. *G06T 5/002* (2013.01); *G06T 5/003* (2013.01); *G06T 5/006* (2013.01); *G06T 5/009* (2013.01); *G06T 5/20* (2013.01); *G06T 2207/10004* (2013.01); *G06T 2207/10024* (2013.01); *G06T 2207/20024* (2013.01); *G06T 2207/20081* (2013.01); *G06T 2207/20084* (2013.01)

(58) Field of Classification Search
CPC . G06T 5/002; G06T 5/20; G06T 2207/20024; G06T 2207/10004
See application file for complete search history.

(56) References Cited

U.S. PATENT DOCUMENTS

| | | | |
|---|---|---|---|
| 6,862,373 B2 | 3/2005 | Enomoto | |
| 7,425,988 B2 | 9/2008 | Okada et al. | |
| 7,995,108 B2 | 8/2011 | Utsugi | |
| 8,340,453 B1* | 12/2012 | Chen | G06T 5/002 |
| | | | 382/254 |
| 8,508,655 B2 | 8/2013 | Suto | |
| 2004/0190762 A1 | 9/2004 | Dowski, Jr. et al. | |
| 2007/0279618 A1 | 12/2007 | Sano et al. | |
| 2008/0225227 A1 | 9/2008 | Allman et al. | |
| 2009/0231565 A1* | 9/2009 | Conradi | G03F 7/70266 |
| | | | 355/55 |
| 2010/0014065 A1* | 1/2010 | Gruner | G02B 7/028 |
| | | | 355/67 |
| 2012/0207401 A1 | 8/2012 | Archer | |
| 2013/0077891 A1 | 3/2013 | Nimnual et al. | |

(Continued)

FOREIGN PATENT DOCUMENTS

JP   11-161773    6/1999
WO   2016171090 A1  10/2016

OTHER PUBLICATIONS

International Search Report for International Application No. PCT/US2017/063461, International Filing Date Nov. 28, 2017, dated Mar. 23, 2018, 4 pages.

(Continued)

*Primary Examiner* — Samir A Ahmed
(74) *Attorney, Agent, or Firm* — Cantor Colburn LLP (57) ABSTRACT

A digital method for removing optical aberrations from the image is disclosed. The method includes the initial profiling of an optical system and using the obtained information to correct the optical aberrations introduces to the image by the same or identical optical system.

22 Claims, 7 Drawing Sheets

(56) References Cited

U.S. PATENT DOCUMENTS

2013/0124159 A1* 5/2013 Chen ................. G06T 5/006
                                                        703/2
2015/0235068 A1   8/2015  Gillet et al.
2015/0293018 A1  10/2015  Stork et al.
2018/0040109 A1   2/2018  Hayashi et al.

OTHER PUBLICATIONS

Written Opinion for International Application No. PCT/US2017/063461, International Filing Date Nov. 28, 2017, dated Mar. 23, 2018, 13 pages.

F. Heide et al., "High-Quality Computational Imaging Through Simple Lenses," *ACM Transactions on Graphics* (*TOG*), vol. 32, Issue 5, Sep. 2013, Article No. 149.

* cited by examiner

DIGITAL CORRECTION OF OPTICAL SYSTEM ABERRATIONS

FIELD OF INVENTION

The present invention relates, generally, to the field of optical systems, and specifically to improvement of the optical imaging devices.

More precisely, the invention enables correcting aberrations of the optical system by a computational component. The invention extends the boundaries of optical design and/or range of applicability of optical systems by improving their quality under physical design constraints. The technology can be applied to various electro-optical imaging systems.

BACKGROUND OF THE INVENTION

The modern imaging technology employs highly sophisticated optical systems, often consisting of dozens individual optical elements. Over the past decades, imaging optics have become increasingly complex in order to provide the light efficiency for such optical systems (e.g. single-lens reflex (SLR) cameras.) Such complexity is typically required for effective usage of the available aperture ratio, as well as for compensation for undesirable artifacts that inherent to a simple lens element.

The elimination or minimizing of non-linear deviations (i.e. aberrations) from the ideal "thin lens" model is an important part of the optimization of the overall imaging system efficiency. The optical aberrations include such artifacts as geometric distortions, chromatic aberration (wavelength-dependent focal plane), spherical aberration (optical axis distance dependent focal length), and coma (angular dependence on focus).

Since each single optical element with spherical surface(s) suffers from the aforementioned artifacts, the combinations of different lens elements have been used, especially when a high-quality imaging is required (e.g. in photography).

The complex aberration compensated optical systems that possess much better geometric imaging properties, however, suffer from other drawbacks, including drastically increased manufacturing cost, weight, lens flare, reduced reliability, etc.

While it is possible to correct the appearance of the chromatic aberration effects using a digital post-processing in some circumstances, in the most of the real-world circumstances, chromatic aberration results in a permanent loss of some image detail.

The proposed invention uses an alternative approach to achieve the high-quality imaging. Namely, instead of more complex optics, the performance improvement is achieved by adding a pre-process or post-process computational component to correct aberrations of the optical system. Such optical component will be hereinafter referred to as a "digital lens" element of the optical system.

There are various methods of computational aberration correction that have been developed and reported. Thus, the lens-profile-based image correction methods typically take the known characteristics of optical lens/system into account for (automatic) correction of various types of lens distortion, such as color fringes at high contrast edges, vignetting, etc.

Indeed, the detailed knowledge of the optical system used to produce the image could play an important role in correcting of the undesirable artifacts in the image. Due to the complexity of the chromatic aberration (relationship to focal length, etc.), the camera manufacturers employ various lens-specific techniques to minimize chromatic aberration appearance.

Nowadays, almost every major camera manufacturer enables some form of chromatic aberration correction, both in-camera and via their proprietary software. Third party software tools (e.g. PTLens, DxO Optics Pro, Adobe Photoshop Lightroom) are also capable of performing complex chromatic aberration appearance reduction with corresponding databases of cameras/lens.

For example, there is a method reported in U.S. Pat. No. 6,862,373 by Enomoto, describing acquisition of both the input data from an image taken by an optical element (lens) and the information about the very lens been used to record this image. The method further describes image processing using information about the focal length and an aperture (i.e. lens iris opening) at the time of recording, as well as lens characteristics to correct aberrations and vignetting in the image.

Another example, as disclosed in Japanese Patent No. 11-161773 by Habu, also describes correcting magnification chromatic aberration without using any optical components. The magnification chromatic aberration data for the lens for each color is pre-stored, and image processing performs enlarging and reducing the image based on the mentioned pre-stored data, thus performing the magnification aberration correction every time an image is obtained through this lens. Then, after magnification correction, the images of each color are combined into a single image, accomplishing the magnification chromatic aberration correction.

There is another method disclosed in U.S. Pat. No. 7,425,988 by Okada (and, similarly, in U.S. Pat. No. 8,508,655 by Suto) that describes magnification or reduction of a picture on each color; a data memory unit to store the chromatic aberration data specific to the imaging lens for each color (including plurality of zoom, focus and aperture values) and a processing unit that controls the conversion factor and the coordinates magnification aberration correction, using both chromatic aberration data (stored in data memory unit) and the detected image (along with the current zoom, focus and aperture values).

In an ideal situation, the post-processing to remove or correct lateral chromatic aberration would require scaling the fringed color channels, or subtracting some of a scaled versions of the fringed channels, so that all channels spatially overlap each other correctly in the final image (e.g. in holographic microscopy).

In practical applications, however, even a theoretically perfect post-processing-based chromatic aberration reduction system does not increase the image detail in comparison to well-corrected physical lens.

From the chromatic aberration perspective, the reasons for this are following: i) A computational rescaling is only applicable to lateral (not longitudinal) chromatic aberrations. ii) The individual rescaling of color channels results in some resolution loss. iii) Chromatic aberration occurs across the light spectrum, yet most camera sensors only capture a few discrete (e.g. RGB) color channels.

Some chromatic aberration cross-channel color contamination is unavoidable in camera sensors.

Since the above problems are closely related to the content of the particular captured image, no reasonable amount of programming and knowledge of the capturing equipment (e.g., camera and lens data) can overcome such limitations completely.

The disclosed method proposes a new, improved non-blind deconvolution approach for electronic optical aberrations correction. Like the other aforementioned methods, the disclosed method is also based on knowledge (i.e. profiling) of the optical system used for imaging. Furthermore, the method consequently processing the arbitrary captured scene with 'digital lens' element of the present disclosure using the profile that is already known for the imaging system.

Compared to other aberration correction techniques, however, the disclosed profiling approach is inherently different, essentially, by utilizing a point-spread function (PSF) extraction for different image scales (i.e. image details) and subsequent artificial neural-network (NN) training. The PSF is an important property in predicting of a light propagation and imaging system performance.

The disclosed method and 'digital lens' element expand the applicability of the digital lens from typical image capture systems (digital cameras) towards a broader imaging applications, including augmented reality (AR)/virtual reality (VR) display systems, headsets, viewfinders, etc.

Further features and aspects of the present invention will become apparent from the following description of preferred and optional embodiments with reference to the attached drawings.

SUMMARY OF THE INVENTION

An optical imaging method and 'digital lens' element for removing optical aberrations from the image is disclosed. The method is based on two independent procedures, with the first procedure to be performed in advance of the second one.

The first procedure includes collecting the optical system information, performing a geometric and a radiometric alignment between computer-generated charts and their image(s), extracting a PSF component with a far-field kernel, and convoluting it with the aligned image to produce a far-field corrected image data. The first procedure also includes preconditioning of the image data to be used for NN training, extracting NN weighting coefficients and creating an optical system profile, which is a data containing the NN weighting coefficients and the far-field kernel.

The second procedure includes capturing an original image by the optical system, extracting the components with low- and high-spatial-frequencies (LF and HF), preconditioning HF components for NN, also using the optical system profile obtained in the first procedure. The reconditioned NN output is further summed with the original LF component forming a single corrected image with the optical aberrations removed.

The method can be used with various optical systems, such as cameras, viewfinder eyepieces and displays with known manufacturer parameters. The method can be applied on segments (tiles) of the images.

The LF and HF components can be calculated using linear low-pass and high-pass filters, respectively, while the preconditioning can include a dynamic range reduction and application of nonlinearity. The NN output can include multiple pixel values while NN training can be performed using a Levenberg-Marquardt algorithm.

The inverse pre-conditioning can be applied to reduce NN training error. The NN output can be calculated using an arithmetic inverse of the HF part, while PSF component extraction can be performed using two-dimensional Fast-Fourier transform.

DETAILED DESCRIPTION OF THE PREFERRED EMBODIMENT

The disclosed invention is generally serves the task of correcting optical aberrations using the a non-blind deconvolution technique that is described further in detail. The term 'non-blind' is used in a sense that the invention utilizes a point spread function (PSF) which is known (e.g. pre-estimated in advance) by "profiling" the optical system of concern. In general, the PSF describes the (3-dimensional) response of an imaging system to a point-like object or point light source. In functional terms, PSF is a transfer function of the imaging system in a spatial domain.

Figure 1:
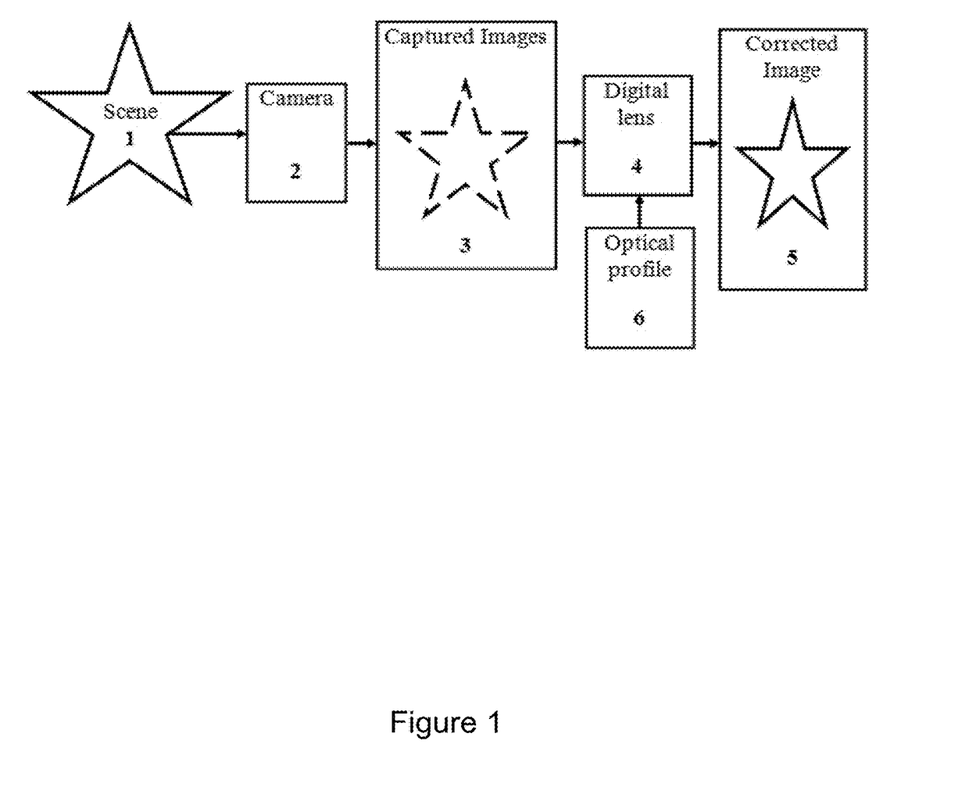
FIG. 1: General view of the optical aberrations correction method.

The general layout of the disclosed invention is shown in FIG. 1, where the scene (1) is observed by the optical system (e.g. camera) (2), which captures the digital images (3) of the scene (1) and provides the corrected image (5) of the scene (1) after applying a digital aberration correction post-processing, performed by a computational component (4) (i.e. 'digital lens') to correct aberrations of the optical system (2), in assumption, that the computational component (4) is provided with the specific information (6) (i.e. 'optical profile') about the optical system (2) in advance. Such specific information (6) is obtained by the profiling the optical system (2) and plays a critical role in the disclosed invention, as will be explained further in detail.

The disclosed method is based on separating the full procedure of computational correction of optical system aberrations into two separate (independent) steps, as follows:

Procedure I:

Profiling of the optical system of choice. In this part the information of how to optimally correct the aberrations induced by this optical system is obtained. This information is then stored in a form of the "optical profile" for this particular optical system. Typically, such profiling of the optical system is a time-consuming, iterative process. Fortunately, it only needs to be performed once for the optical system of choice (e.g. once it is designed and manufactured).

Procedure II:

Correcting the aberrations of the optical system by using the "optical profile" obtained during the Procedure I. This step is non-iterative, relatively fast, enabling to perform the optical aberrations correction of an image, for example, at video signal framerates, either on existing image processors and/or in a power-constrained mobile devices.

Such separation of the procedure into two steps also allows extending the method's applicability range, for example, from image capture systems (digital cameras) to more general optical imaging applications, including various modern AR/VR displays/headsets systems, viewfinder eyepieces, etc.

In the preferred embodiment of the invention, the Procedure I can be carried out in optical system of choice by replacing the position of human eye with a high-quality image-capturing device. Consequently, any future image that produced by this optical system can be corrected routinely in the Procedure II, essentially, canceling the aberrations (intrinsic to such known, imperfect optical system) out.

Thus, the preferred embodiment of the invention includes two, generally separate procedures: Procedure I, —profiling of an optical system, specifically, obtaining the 'optical profile' containing the information about the optical system, and Procedure II, —applying the optical profile obtained in the Procedure I to an image being captured by the same (or identical) optical system in order to reduce the optical aberrations in the captured image.

During the Procedure II, the so-called "digital lens" correction is applied directly to the data (image) obtained by the optical system (i.e. camera) in Procedure I. Corrected image can passed through the image signal processing in a the same way as one without the "digital lens" correction.

Figure 2:
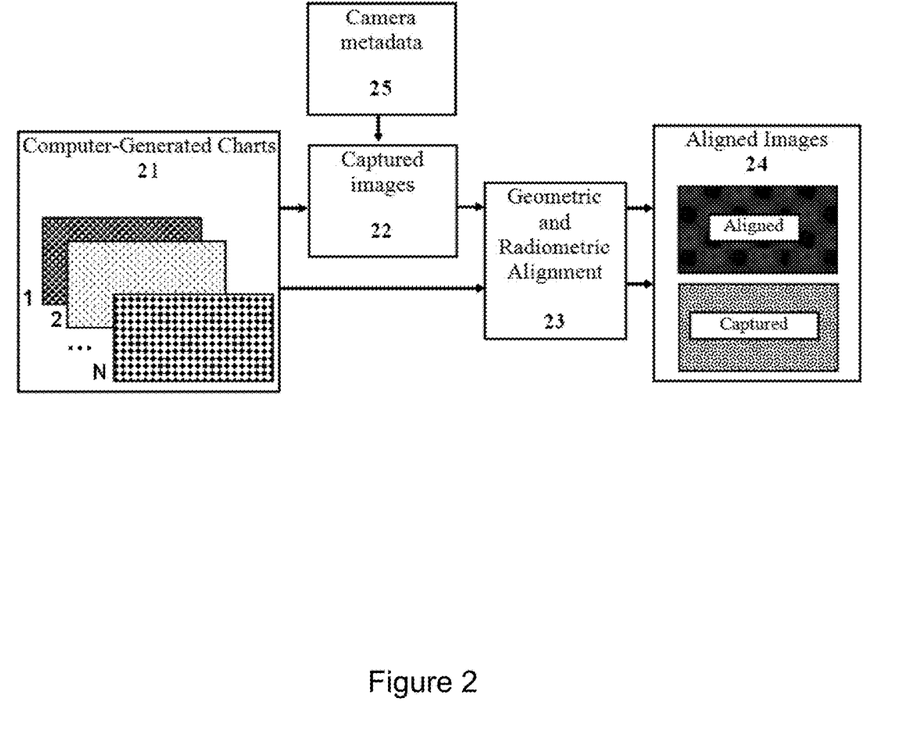
FIG. 2: Geometric and radiometric alignment of charts and images.

The Procedure I of the preferred embodiment of the invention divided, in turn, into 2 major steps, as described here in detail with reference to FIG. 2.

Step 1: Profiling Images Capture and Geometric/Radiometric Alignment.

In this step, described in FIG. 2, a set of computer-generated charts is created. These charts are either printed on paper or displayed on a high-quality/high-resolution display, to be captured through the optical system/camera.

Then, the computer-generated charts are captured by an optical system to be profiled (also shown as (3) in FIG. 1), producing a sequence of, generally N, images (21).

The captured sequence of images (21) includes the knowledge of the optical system's parameters (i.e. metadata of the camera used during the capture), such as focus distance, aperture size (lens iris value), focal length, etc.

Then, the geometric and radiometric alignments (23) of the charts (21) from the sequence of captured images is performed. For this purpose, a subset of profiling images from the sequence (21) and their captured versions (output of (22)) is used to facilitate the geometric alignment (i.e. scene/features alignment) and radiometric alignment (i.e. estimating the nonlinear function of color values in each image and applying it to align images radiometrically, so that the color values are consistent for all images of a sequence).

Note, that during such alignment procedures, the computer generated charts (21) are aligned with the captured images, i.e. the versions of the chart images captured by the system being profiled. All such captured images are captured with the same camera settings and under same illumination conditions, so they do not require alignment to each other.

There are various established image processing techniques for geometric and radiometric alignment have been reported in the prior art which can be utilized by the disclosed method with the goal of providing an accurate (as possible) image alignment in terms of matched colors and geometric features of the charts.

The output of this alignment process (23) is a pair of aligned images (24). In a preferable embodiment if the invention, a subset of computer generated charts, geometrically and radiometrically aligned to their captured versions is provided as a part of an output (24) of the alignment process. As shown in the FIG. 2, such pair includes so-called 'Aligned' and the corresponding 'Captured' image.

These images (24) (i.e. aligned charts and their captured versions together) are further used in creation of the optical system profile, specifically, for extracting knowledge about the way by which the aberrations of the particular optical system will be corrected.

Step 2: Optical Profile Creation for the Optical System.

This Step 2 of the Procedure I is explained in in details below and uses the 'Aligned' image and the 'Captured' image from the previous step to perform an actual system profiling, see (24) in FIG. 2.

Figure 3:
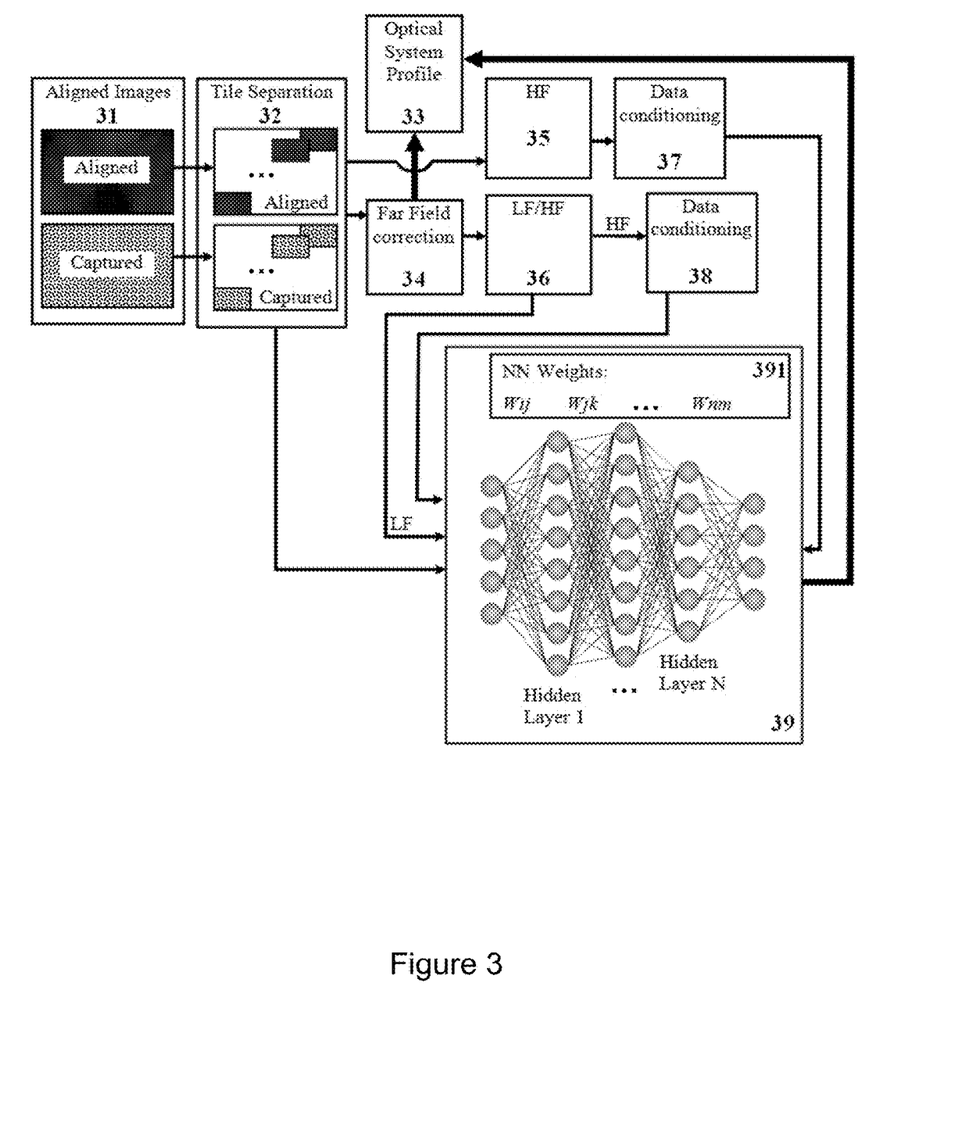
FIG. 3: Optical system profiling.

A complete process of profile creation (i.e. Procedure I) for an optical system is depicted in FIG. 3. The process starts with a pair of input images—aligned and captured (31), which are (optionally) divided into tiles (32) (described later in detail in Step 2a with the reference to the following FIG. 4). This data is passed to a far-field correction (34), which includes the far-field image correction and point spread function (PSF) extraction (described later in detail in Step 2b with the reference to the following FIG. 4).

The far-field correction (34), in turn, provides two outputs: far-field kernel coefficients stored into optical system profile (33) and pixel data that has only near-field aberrations remaining.

These pixel data follows through the LF/HF separation (36). The outputs of (36) are provided in form of the inputs for the NN (39). For this purpose, the pixel data containing LF spatial frequencies is passed directly, while the pixel data containing HF spatial frequencies undergoes a data conditioning (38) before being transferred to NN (39).

The coordinates of the pixel data (either within the image plane or within the tile), which is provided directly from (32) (or (31) if tiling step is not used) forms another input of NN (39).

During the Procedure 1 (profiling) the NN (39) requires a target pixel data to be trained. Such pixel data is provided from the aligned image through HF filter (35) and data conditioning (37). The NN weights and biases (391) obtained by the training are also stored in the optical system profile (33).

The process of far-field image correction and point spread function (PSF) extraction is shown in the FIG. 3 as the procedure (34), and described later in more detail, in connection to FIG. 4.

Step 2c. With the reference to the FIG. 3, the data of Aligned and Captured images (31) (or their aligned tiles (32)) is separated into two parts, according to the data spatial frequencies, as follows:

One part (35) will only include the content with the high-spatial-frequencies (hereinafter the HF part extracted from the data), while another part (36) will have both the HF part and an LF part (the content with the low-spatial-frequencies, extracted from the data). This separation can be realized by application of well-known linear filters that based on a low-pass and high-pass kernels, respectively.

Importantly, the LF part (36) is not typically affected by aberrations and, therefore, can be passed as-is, without processing. The HF part (35), however, needs to be properly corrected in order to obtain a desirable improved image.

As mentioned, the LF part (36) and the HF (35) part are both extracted separately for the 'Aligned' and the 'Captured' images, or their respective tiles, if the option of dividing the images into the tiles is chosen.

Step 2d. With the reference to the FIG. 3, the previously obtained pixel data from the HF part is prepared (i.e. 'conditioned') by the conditioning procedure (37) to play a role of an input data (i.e. reference data) for the NN training (39). Typically, the NN (39) is used in a machine-learning procedure to estimate (or approximate) functions coefficients (391) that depend on a large number of, generally, unknown, inputs. In image-processing, the NN can use the reference (input) image for self-pretraining procedure, which is known.

Various known data preconditioning techniques can routinely be used before the launch of the NN training. Reconditioning (37) (data manipulation after the NN training) can also be used to improve the NN training efficiency, e.g. to reduce a NN training error.

Reconditioning (37) is similar to inverse of pre-conditioning steps (38). For example, when the dynamic range of NN data is reduced in some way, the output of the NN should be reconditioned with correspondent dynamic range expansion.

In the preferred embodiment of the invention, such data (preconditioning by (38) and post conditioning by (37)) include any combination of the following two procedures:
1) A reduction of the dynamic range of the data. Generally, NN operates optimally when it is provided with the data having a limited dynamic range. There are many well-known ways to reduce the dynamic range of the data. One possible way is to normalize the input data by either a sum of input pixels' values or by a maximum input pixel value.
2) Application of nonlinearity to the pixel's value. Such nonlinearity serves to emphasize the contribution of pixel having small values, hence instructing the NN to produce a more accurate result for small-amplitude inputs. This, in turn, results in a better signal-to-noise ratio (SNR) in the output image. For example, the introduced nonlinearity can have a form of A^(1-alpha), where: A—is a pixel value and alpha—is a small constant (typically in the range of 0.02-0.2).

Once trained, the NN algorithm (including data pre- and post-conditioning) will obtain the information (33), i.e. "Optical System profile" about how to convert the aberrated (e.g. blurred) image into the one that is as close to the perfect (without aberrations) as possible.

The NN (39) operates in a pixel-wise fashion. Accordingly, in order to correct aberrations for a particular pixel, a certain neighborhood (within the input captured image (32)) of this pixel is processed. In the preferred embodiment of the invention, the data is prepared for the NN inputs and outputs, as described in details with reference to FIG. 3.

The NN (39) is provided with the knowledge of the processed pixel's location, effectively allowing the NN (39) adapting to variability of the PSF over the given tile. For this purpose, the pixel coordinates (31) are passed to the inputs of NN (33) from the tiling step (32) taken from the Captured image (34).

The HF part (36) from the Captured image tiles (32) is passed to the inputs of NN (39) after being subjected to aforementioned 'data conditioning' (38). This HF part (36) is extracted using pixels within a certain neighborhood (e.g. less than nine pixels distance from the pixel being processed) of the captured image.

The HF part (35) of pixels being processed from the aligned image tiles (32) is also passed to the outputs of NN (39) after being subjected to aforementioned 'data conditioning' (37) and serves as an NN output data.

Moreover, the LF part (36) from the Captured image tiles (32) is passed to the inputs of NN (39). As mentioned, this LF part (36) is extracted using pixels within a larger neighborhood (e.g. farther than eight pixels distance from the pixel being processed) of the captured image.

Figure 6:
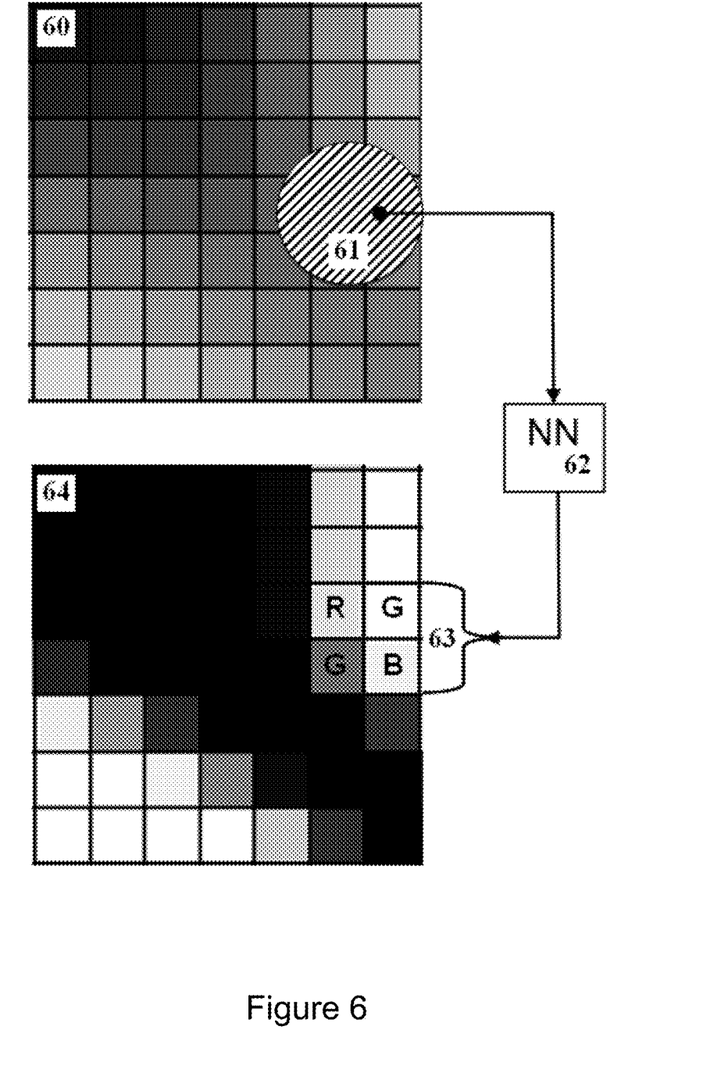
FIG. 6: Example of using a Bayer filter with a pixel quad (RG/GB) for the NN output data.

It should be noted that in some embodiments of the invention, the pixel input data is obtained straightforwardly from a mosaic-filtered sensor, without any pre-processing that provided by imaging system signal processor (ISP). For example, the Bayer filter can be used, which is a color filter mosaic array applied to photo-sensor matrix to arrange RGB color filters in a square grid pattern. Such arrangement of color filters is used in most single-chip digital image sensors found in digital color cameras, camcorders, and scanners. In such case, it is possible to use such type of NN that produce multiple pixel values in output at once (quad pixels in case of the bayer pattern), as will be described later in connection to FIG. 6.

Once all the input and the output data is prepared, the NN training is launched.

In the preferred embodiment of the invention, the training is performed using well-known training algorithms, such as Levenberg-Marquardt, for example. Weights of the trained NN (marked (391) in FIG. 4) are extracted and stored in the form of the 'optical system profile' along with the kernel obtained from the far-field correction step (34). The weights and kernel are unique per each tile, so each tile has it's own set of such parameters.

As mentioned, the preferred embodiment of the invention includes two, generally separate, procedures: the Procedure I, which produce the 'optical system profile' and the Procedure II—which applies the profile obtained in the Procedure I to an image being captured by the same (i.e. identical) optical system, in order to reduce the optical aberrations of the captured image.

The complete process of profile creation (the Procedure I) for an optical system was explained with the reference to FIG. 3. The far-field image correction (34) and point spread function (PSF) extraction (Steps 2a-2b) are described here in more detail, with the reference to FIG. 4.

In the Step 2a, the images (provided by field of view of the camera, initially shown as (24) in FIG. 2) can optionally be divided into smaller parts, hereinafter called the 'tiles' of the Captured image (42) and the Aligned image (41), respectively, using a Tile Separation procedure (40).

The aforementioned PSF is highly variable by its nature due to its dependence on a size, concentration and distribution of various features within the optical system field of view. Accordingly, the (optional) steps (41) and (42) are generally performed to reduce such variability of PSF shape within the field of view of the given optical system. Within each single tile, the PSF variability (i.e. aberrations) is lower (although still present) and, therefore, can be more effectively compensated, compare to the original (Captured and/or Aligned) images.

In the Step 2b, so-called remote correction is performed, which is explained below in connection to the FIG. 4. The PSF approximation is extracted (43) and then separated into two parts: the near-field part (44) calculated within a certain neighborhood of a processed pixel (e.g. with radius of less than six pixels); and the far-field part (46), where the PSF (and aberrations) is extracted outside of the near-part radius.

The mentioned extraction of the PSF approximation (43) from the input data can be based on one of the many methods known in prior art, see for example Felix et. al. While this reported method provides a very accurate PSF estimation, it is very time consuming. For the sake of reducing computational load, a simpler method would be much preferred.

In the preferred embodiment of the disclosed invention, the following approach is implemented for (43): i) A two-dimensional (2D) Fourier transform of the tile of the Captured image is divided by a 2D Fourier transform of the corresponding tile of Aligned image. ii) The result is transformed back with 2D inverse Fourier transform.

Such approach is well-known to one experienced in the art. It worth mentioning that in order to avoid the potential noise over-amplification (i.e. low-amplitude image frequency of the Aligned image), a guarding bias value(s) should be added to the values of the frequency components of the Aligned image.

The far-field kernel calculation (45) and convolution (47) result in an image with the aberrations and blur caused by the far-field part are corrected. The parameters of the chosen far-field correction (i.e. the kernel coefficients (45) obtained from the far-field correction (46)) are recorded for a later use, along with the optical system profile, as described below.

In image processing, a kernel is a convolution matrix (much smaller than image itself) that is used for modification of the image (e.g. sharpening, blurring, edge detection, etc.). This is accomplished by applying a matrix convolution operation between a specific kernel and an image of choice.

Near-field part of the PSF (44) is discarded, because a simple reversion for the near-field PSF is not possible without a significant noise magnification of the output image.

The reason for aforementioned separation (44) and (46) into the near-field and the far-field is twofold. First, the far-field correction does not amplify the noise, eliminating undesirable artifacts, and, therefore, can be carried out by relatively simpler methods that require less computational resources. Secondly, such near-field correction requires a limited amount of input data to be processed, hence further reducing the processing requirements. Such separation is performed arithmetically. In a simplest way, all PSF values within certain radius are forming the near-part, while all PSF values outside of this radius are forming the far-part. In practice though, there is some smooth transitional region between these two parts.

To have such a smooth transition, a frequency domain approach is preferable and a two-dimensional fast-Fourier transform (2D FFT) of the PSF is calculated.

The far-field part (46) is obtained by multiplying frequency components by the window which has a zero amplitude at high frequencies while approaches a unit value at low frequencies. A Gaussian 2D distribution would be a convenient example of such window.

A 2D inverse transform is employed to obtain the far-field part (36) in a spatial domain.

Since the far-field corrections do not have any high-frequency spatial components, its application does not amplify any high-frequency noise components. Therefore, a far-field kernel construction procedure (45) and can be straightforwardly realized by some well-known methods.

The method used in the preferred embodiment utilizes a convolution of the input image with the obtained far-part PSF, following by subtraction of the result from the input image. Such (relatively simple) approach would effectively correct the first-order blur and aberrations caused by the optical system.

It should be noted that so-called secondary aberrations can still be induced due to the fact that the captured image (used for processing) is already aberrated, However, since in typical optical systems, the far-field effects are low in amplitude, the secondary effects of such aforementioned correction are negligible.

When the far-field kernel (45) is constructed, its coefficients are passed to the optical system profile. Then, the kernel is convoluted (47) with the captured image tile pixel data, resulting in another output of the far-field correction (shown as (34)-(36) connection in the previous FIG. 3). This output is the tile that contains only near-field remaining aberrations (48).

Figure 5:
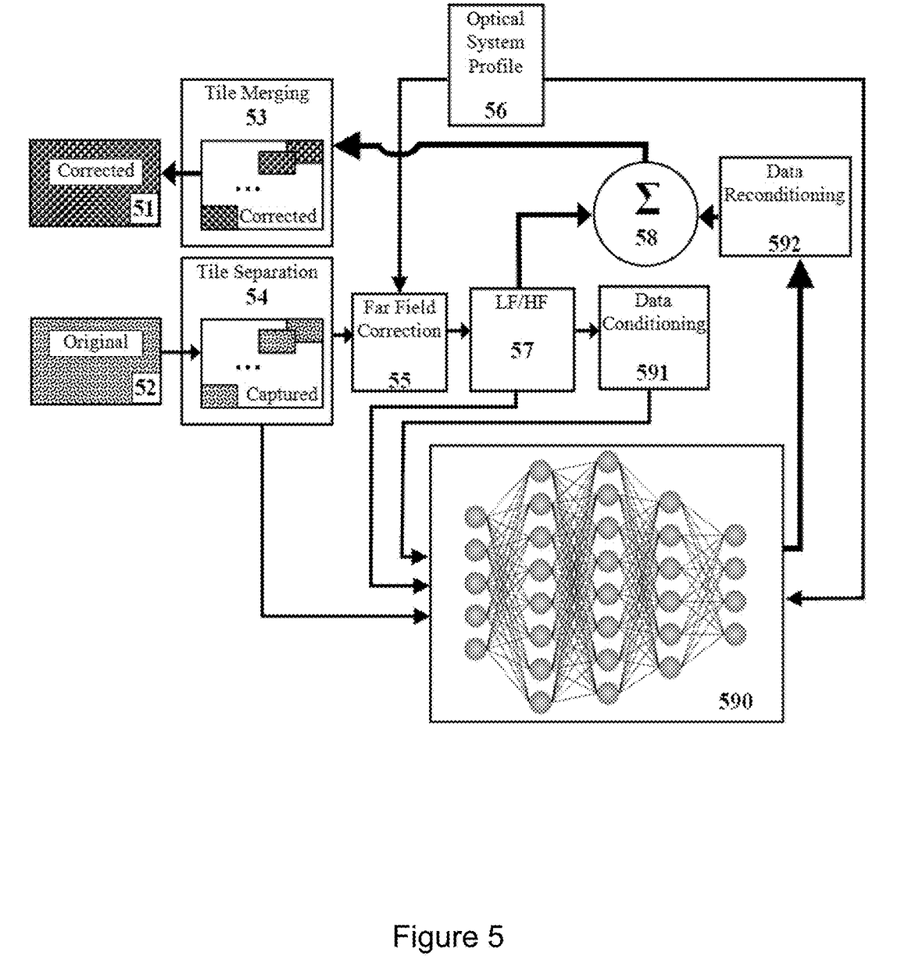
FIG. 5: Image processing

The Procedure II is the application of the described 'digital lens' to the captured image, as explained here in detail with reference to FIG. 5 for the preferred embodiment of the invention.

The original captured image (52) and optical system profile (56) are the inputs for the Procedure II processing. Original image's pixel data is (optionally) separated into tiles (54). It further undergoes the far-field correction (55) using the kernel coefficients from optical system profile (56). Afterwards, the pixel data goes through LF/HF separation (57) with its outputs being the inputs for NN (590).

Thus, the pixel data containing only the LF spatial frequencies is passed directly, while the pixel data containing HF spatial frequencies undergoes the data conditioning (591) before being transferred to NN (590).

Yet another input to NN (590) is the coordinate of the pixel data (either within the image plane or within the tile), which is provided by the (54) (or directly by the (52) if the tiling procedure is not used).

Weights and biases of NN (590) are obtained for a given tile from the optical system profile (56). Output of NN (590) undergoes the data re-conditioning (593) and is summed up (58) with the LF output obtained from LF/HF separation filter (57). The summed result is further recombined (53) merging the individual tiles into a single image (on if tiling step was used). Such merging forms the corrected output image (51).

Figure 4:
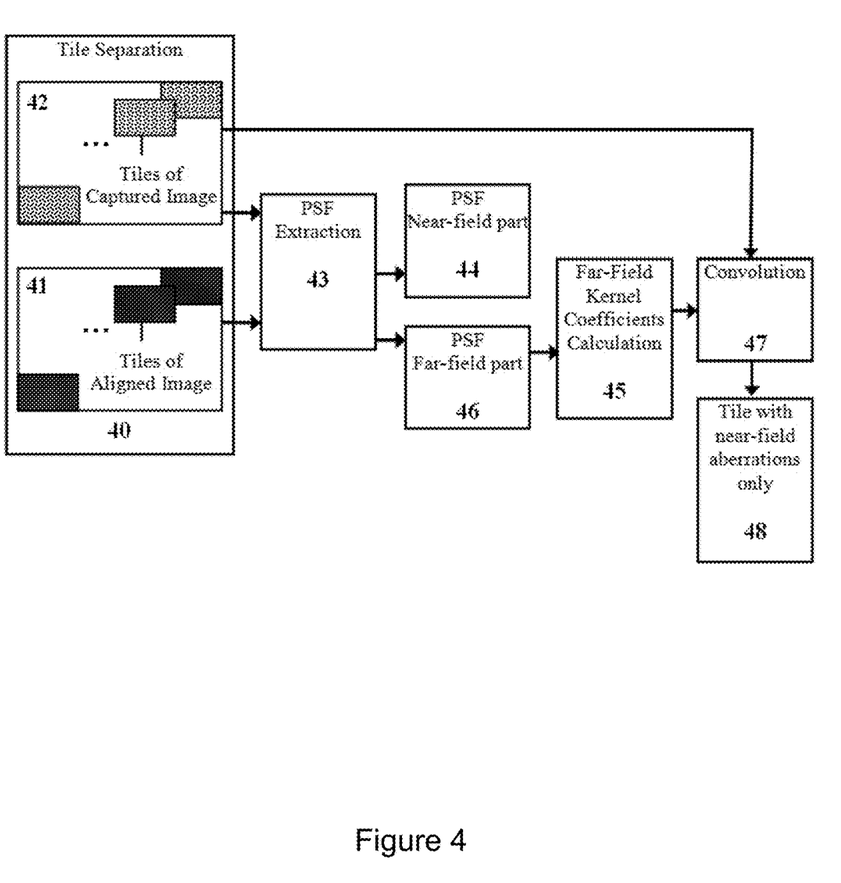
FIG. 4: Far-field image correction and point spread function (PSF) extraction.

The processing of an arbitrary captured scene (while the profile (56) was already been prepared for this system in the Procedure I (FIG. 4, (43)) is performed using processing similar to the Procedure I (optical system profiling), with only a few changes in a data-flow.

The input (52) is the captured scene to be processed is passed through the tiling procedure (54) in a similar manner to one described in the Procedure I, Step 2a, see FIG. 3 and FIG. 4.

Then, the far-field correction (55) is performed in a similar manner to one described in the Procedure I, Step 2b, see FIG. 4, with the difference that the far-field correction kernel is already known as being obtained in the Procedure I, Step 2c.

Then, the image data is separated into the LF part and the HF part (57), similarly to the LF/HF separation procedure explained in the Procedure I, Step 2c, see FIG. 3.

The HF part is further passed through the pixel data' conditioning procedure (591), similarly to the conditioning explained in the Procedure I, Step 2d, see FIG. 4.

The described procedures (52), (54), and (55), along with the optical system profile (56) obtained in the Procedure I, form an input data for the NN (590). This data is similar to one obtained in the Procedure I during the system profiling step in terms of pixel coordinates. As before, it also has the LF, and HF part of pixels processed within the different neighborhoods.

The following processing of the output of NN (590), ultimately, forms the image (51) (through the tile merging (53)) which is a desired image, in a sense that the optical aberrations have been removed. Specifically, the NN (590) output value is undergoing the data reconditioning procedure (592), which, in the preferable embodiment of the invention, realized by ab arithmetic inverse of the data conditioning procedure (590). This result is subsequently summed by the (58) with the LF part (57) of processed pixels.

Finally, all processed tiles (53) of the input image are re-combined, to form a single output image (51). In the preferred embodiment of the invention, the tiles combined in (53) have some overlapping areas. In these areas, the result of processing (53) is smoothly attenuated from one tile to another, to eliminate any visible seams during their merging into the final image (51). Such visible seams are caused by a tile-to-tile deviation from the corrected output.

In another embodiment of the invention, speed optimizations of the digital lens processing can be performed. Thus, with the reference to the FIG. 6, in order to output a single pixel, the pixel's neighborhood (61) in the input image is processed by applying the NN (62). The size (e.g. a 'diameter' (61) chosen at the profiling procedure) of this neighborhood depends on optical system characteristics. For example, if the Bayer filter is used for the input and output data, then the four-pixel quad (RG/GB) (63) can be computed at once.

In yet another embodiment of the invention, the monitor (either display, virtual reality headset or a viewfinder eyepiece) can be used for the profiling procedure of the optical system. In such embodiment, the monitor is used to display profiling images; the high-quality/high-resolution camera is placed precisely at the location where the observer eye will be during normal operation; and the profiling images are captured with this camera. Then, the optical system profile is created, similarly to the method described above.

Figure 7:
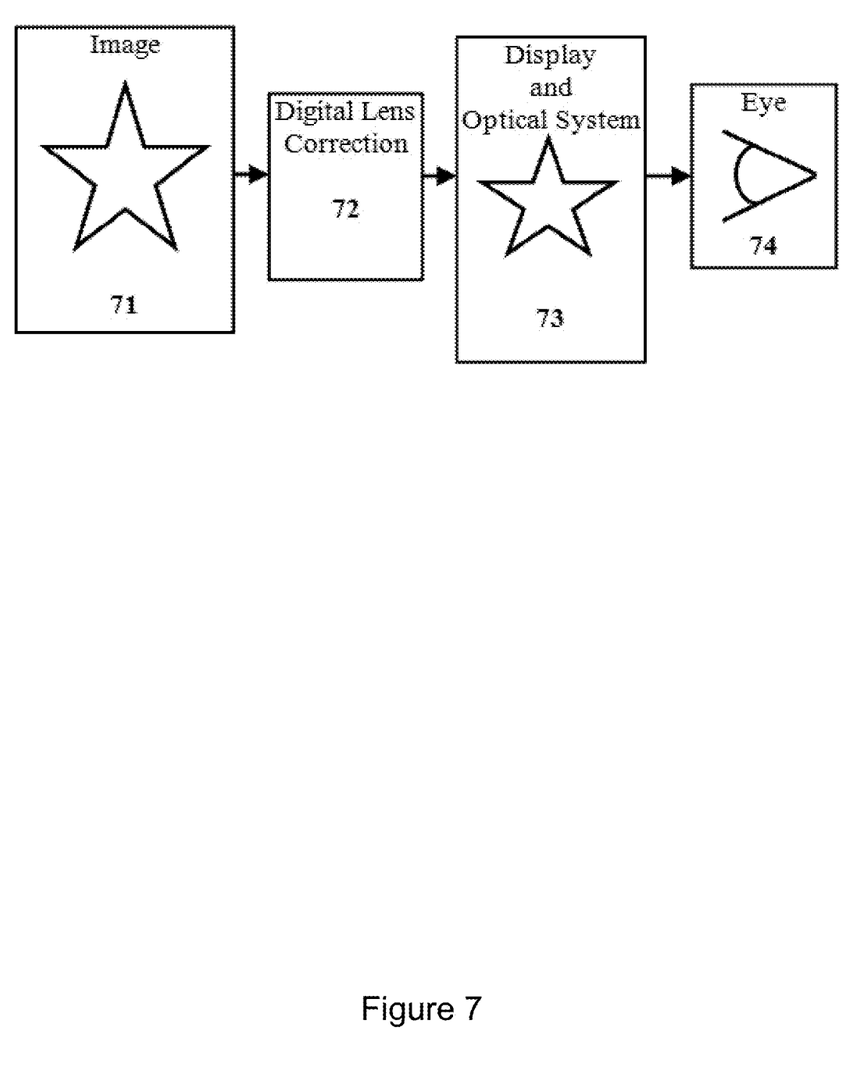
FIG. 7: Optical aberrations correction for display systems.

With the reference to the FIG. 7, in order to obtain a corrected image during normal operation of such embodiment, the image (71) is initially passed through the digital lens correction (72), and then transferred to the display device (73). The corrected image is then observed (74) by the observer.

Further improvements of the VR headset include eye pupil position tracking (by an eye-tracker) for the optimal performance. Complete optical system in this case includes the eye pupil with, generally, arbitrary (non-optimal) location. Knowing the position of the eye relatively to the rest of the optical system allows an accurate correction of aberrations that arise in such system.

Although several exemplary embodiments have been herein shown and described, those of skill in the art will recognize that many modifications and variations are possible without departing from the spirit and scope of the invention, and it is intended to measure the invention only by the appended claims.

What claimed is:

1. An optical imaging method for removing optical aberrations, wherein a captured image being captured by an optical system, comprising:
   a first procedure and a second procedure, wherein the first procedure is performed in advance of the second procedure, the first procedure is comprising of:
      collecting an optical system information, extracting a point-spread function (PSF) from a single focus distance,
      separating the PSF into parts, the parts being at least a near-field part and a far-field part,
      producing a far-field correction, training a neural-network (NN),
      extracting a weighting coefficients of the NN, and creating an optical system profile; and
   the second procedure is comprising of:
      creating an original image in the optical system, applying the far-field correction,
      calculating a NN output, and
      forming a corrected image, wherein the corrected image is the original image with reduced optical aberrations,
      wherein the original image is the only image captured by the optical system.

2. The method of claim 1, wherein the first procedure further comprising:
   collecting the optical system information, wherein the optical system information is a focus distance, an aperture size, and a focal length, creating a set of computer-generated charts,
   creating a sequence of captured images of the computer-generated charts by the optical system,
   performing a geometric alignment and a radiometric alignment between the sequence of captured images and the computer-generated charts,
   producing an aligned image from the geometric alignment and the radiometric alignment, and
   creating a close neighborhood and a remote neighborhood within the aligned image.

3. The method of claim 2, wherein the near-field part being calculated using the close neighborhood, and the far-field part being calculated using the remote neighborhood.

4. The method of claim 2, wherein the far-field correction being a convolution of the far-field kernel with the aligned image, the far-field corrected image containing only near-field aberrations.

5. The method of claim 2, wherein the optical system information includes lens manufacturer parameters.

6. The method of claim 2, wherein the first procedure further comprising: separating the aligned image into an aligned low-spatial-frequency (LF) part containing low-spatial-frequencies being calculated using the close neighborhood, and an aligned high-spatial-frequency (HF) part containing only high-spatial-frequencies being calculated using the remote neighborhood, calculating a preconditioned aligned HF part using the aligned HF part, and providing a first input data for NN, wherein the first input data is the combination of the preconditioned aligned HF part and a captured LF part.

7. The method of claim 6, wherein the aligned LF part is calculated using linear low-pass filter and the aligned HF part is calculated using linear high-pass filter.

8. The method of claim 6, wherein the preconditioned aligned HF comprises a combination of dynamic range reduction of the aligned LF part and application of nonlinearity to the aligned LF part.

9. The method of claim 2, further comprising extraction of captured tiles from the captured image, and extraction of aligned tiles from the aligned image.

10. The method of claim 9, wherein the forming of the single corrected image includes merging corrected tiles.

11. The method of claim 10, wherein the merging of the corrected tiles includes elimination of seams between the corrected tiles.

12. The method of claim 1, wherein far-field kernel coefficients calculated from the far-field part.

13. The method of claim 1, wherein the optical system profile being a data containing the NN weighting coefficients and the far-field kernel coefficients, wherein the optical system profile being unique per each aligned image.

14. The method of claim 1, wherein the second procedure further comprising:
   creating a close neighborhood and a remote neighborhood within the original image, separating the original image into an original LF part containing only low-spatial-frequencies being calculated using the close neighborhood, and an original HF part containing only high-spatial-frequencies being calculated using the remote neighborhood, calculating a preconditioned original HF part using the original HF part, providing a second input data for the NN, wherein the second input data is a combination of the optical system profile, the preconditioned original HF Part and the original LF part, calculating a reconditioned NN output from an output value of the NN, and performing a summation of the output value of the reconditioned NN with the original LF part.

15. The method of claim 14, wherein the reconditioned NN output is calculated using an arithmetic inverse of a preconditioned captured HF part.

16. The method of claim 1, wherein the optical system is a camera.

17. The method of claim 1, wherein the optical system is a viewfinder eyepiece.

18. The method of claim 1, wherein the optical system is a display.

19. The method of claim 1, wherein the output value of the NN has multiple pixel values.

20. The method of claim 1, wherein a reconditioning is used to reduce an error in the step of training of the NN, wherein the reconditioning being inverse to a pre-conditioning.

21. The method of claim 1, wherein the separating of the PSF is performed using Fast-Fourier Transform (2D FFT).

22. An optical system for removing optical aberrations, wherein the optical system has an optical profile, the optical system comprising:
a lens which forms a captured image having optical aberrations,
an array of photosensitive elements disposed within the optical system, a conversion component that converts the captured image into a digital image, and
a computational component configured to form a corrected image by removing the optical aberrations from the digital image through corrections based on the optical profile,
wherein the optical aberrations comprising longitudinal aberrations, and
wherein the optical profile is formed by collecting the optical system information, extracting a point-spread function (PSF) from a single focus distance, separating the PSF into parts, the parts being at least a near-field part and a far-field part, producing a far-field correction, training a neural-network (NN), extracting a weighting coefficients of the NN, and creating an optical system profile; and wherein the corrections are applied by creating a digital image, applying the far-field correction, calculating a NN output, and forming the corrected image, wherein the digital image is the only image captured by the optical system.

* * * * *